United States Patent [19]
Johnson

[11] 4,363,989
[45] Dec. 14, 1982

[54] PSEUDO ELECTRODE ASSEMBLY

[76] Inventor: Lester Johnson, 150-30 71st Ave., Flushing, N.Y. 11367

[21] Appl. No.: 146,673

[22] Filed: May 5, 1980

Related U.S. Application Data

[63] Continuation-in-part of Ser. No. 873,278, Feb. 17, 1978, abandoned.

[51] Int. Cl.³ .............................................. H02N 3/00
[52] U.S. Cl. ..................................... 310/306; 310/308
[58] Field of Search ................. 310/306, 308, 309, 10, 310/11

[56] References Cited

U.S. PATENT DOCUMENTS 3,360,663  12/1967  Crewe et al. ......................... 310/308
3,519,854  7/1970  Davis .................................... 310/306

Primary Examiner—Donovan F. Duggan

[57] ABSTRACT

A device for generating an electric current having a discharge chamber capable of containing an ionizable medium which provides free charges in said chamber, a means for ionizing the medium and releasing free charges therein, an accelerating means located external to said chamber to prevent its neutralization by the free charges therein and capable of exerting an accelerating field in the chamber to accelerate the free charges, and a means for collecting the free charges in said chamber and discharging them through a load circuit to generate an electric current.

11 Claims, 1 Drawing Figure

PSEUDO ELECTRODE ASSEMBLY

CROSS REFERENCE TO RELATED APPLICATION

This application is a continuation-in-part of U.S. patent application Ser. No. 873,278 filed Feb. 17, 1978, now abandoned, the disclosure of which is incorporated herein by reference.

BACKGROUND OF THE INVENTION

The present generation of electric power is principally accomplished by conventional means which includes hydroelectric, fossil fuel or nuclear power devices. These conventional devices are subject to either major costs in fuel expenditure to operate or environmental limitations, or both. Basic operation of all generators involves the production of a potential difference or electromotive force [EMF] to drive free charges through a circuit as electric current. In conventional devices, this is accomplished by the rotation of large magnets or electromagnets about a conducting coil. The changing magnetic fields cut across the coil; creating electric fields and inducing the EMF. However, to effect such rotation in the case of fuel fed systems, tremendous quantities of fuel is expended, in addition to the environmental impact of such operation.

SUMMARY OF THE INVENTION

Accordingly, it is an object of the present invention to provide for an electric power generator which is versatile and operates to produce an EMF or potential difference in a relatively inexpensive manner.

The present invention proposes to use a device whose operation is similar to that disclosed in my related co-pending U.S. application Ser. No. 127,129 filed Mar. 4, 1980 providing however an alternative and improved mode of operation. In this regard, there is provided a gas discharge power generator utilizing accelerating electrodes which are electrostatically charged to provide the necessary potential or EMF for power generation; eliminating the need for use of rotary magnetic medium to perform same function. Since electrostatic potentials are very inexpensively created, the fuel expenditure or fuel cost of producing or generating the EMF utilizing this method, is greatly decreased.

These electrodes are associated with a gas discharge chamber containing an ionizable medium and collectors to accumulate any free charges therein. The electrodes are oppositely charged and serve to generate a potential difference through the medium in the chamber. To prevent neutralization of the electrodes, they are located outside the chamber, so as not to be neutralized by the free charges therein.

In addition, to prevent the electrodes from neutralizing each other, they are contained in a second chamber having perhaps insulating medium therebetween.

Also, the prevent device proposes to utilize a radioactive or beta emitting means in the chamber to initiate ionization of the gas as an alternative to a thermionic emitter with heating filament.

The operation of the device would be essentially as follows. The beta particle emitting means releases free charges in the chamber containing the ionizable medium. The charged electrodes cause the acceleration of the free charges; thereby providing kinetic energy to the free charges in the gas. Such energized charges heavily ionize the gas through collisions and create an electronic plasma consisting primarily of an abundance of positive and negative ions, and some neutral gas atoms. Simultaneous with ionizing the gas atoms, the accelerated free charges move in opposite directions (under the influence of the electrostatically provided potentials) to the ends of the discharge chamber, where they accumulate on collectors; polarizing them in doing so. Since both collectors are connected by a common conductor, a difference in potentials arises from the charges accumulated thereon creating an electromotive force which drives electrons as a current through a load circuit, generating power. The accelerators on which the electrostatic charges are accumulated, are positioned outside of the discharge chamber so that charges providing the potentials will not be neutralized by combination with the accumulated charges or the free charges populating the space within the discharge chamber.

DETAILED DESCRIPTION OF THE PREFERRED EMBODIMENT

Figure 1:
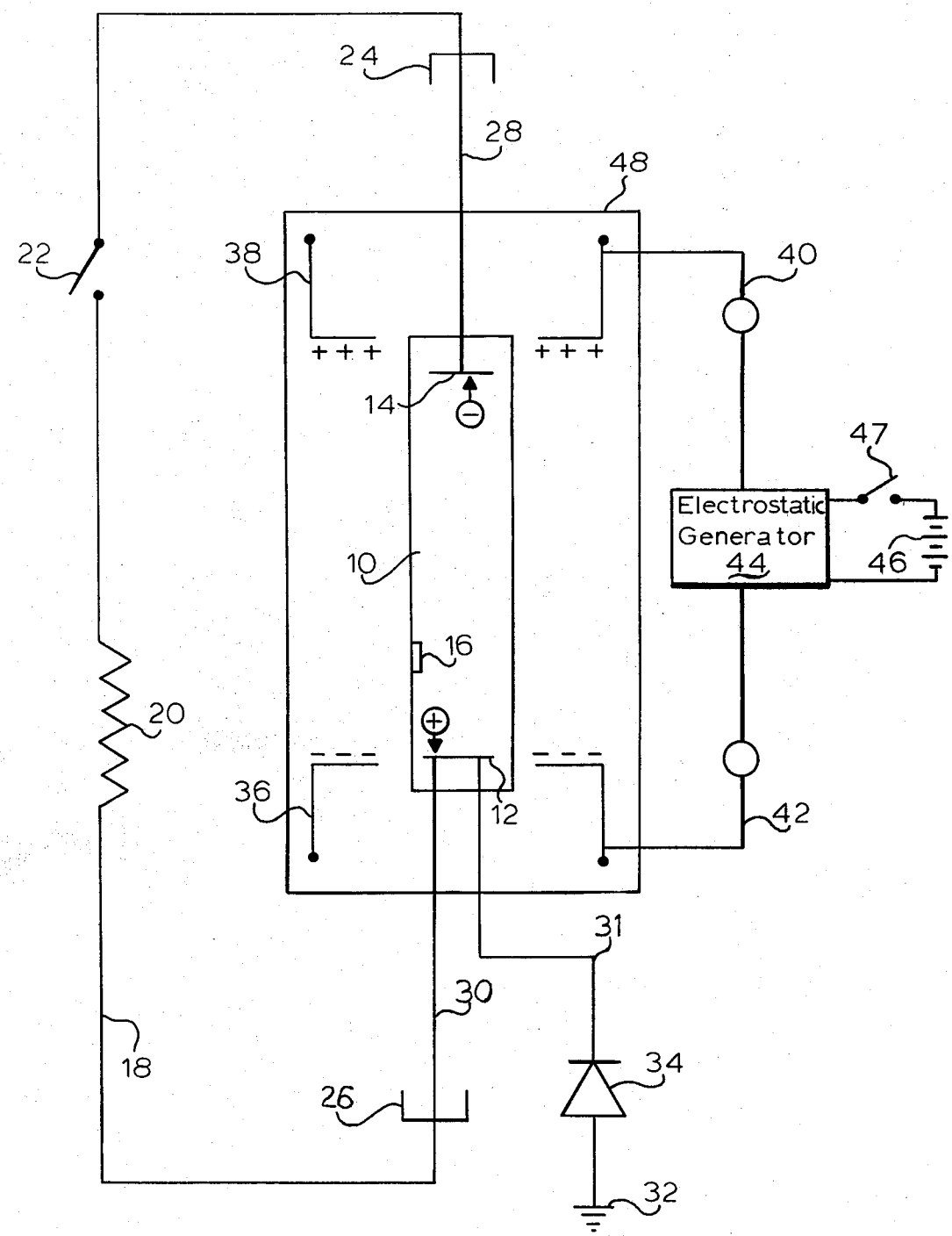
FIG. 1 is a somewhat schematic depiction of the electric generator incorporating the teachings of the invention.

With regard now to the figure, there is shown the electric generator which is provided with a discharge chamber 10, which may be cylindrical in shape, and made on a non-conductive material such as glass which allows the passing of electric fields, and contains an ionizable medium under a pressure situation, such as an inert gas having a low ionizable potential.

Also contained in the chamber 10 is an emitter electrode 12, which may be of the thermionic type, positioned at one end of the chamber with a collector electrode 14, made of a conductive material such as a metal, at the opposite end.

In addition, a radioactive source i.e., beta emitting means, 16 or any other type high energy particle emitter may be provided in the chamber to initiate ionizing the medium, as later discussed.

A conductor 18 is provided having a load 20 and switch means 22 and connected to the collector 14 and emitter 12 via terminals 24 and 26 and leads 28 and 30 respectively. The terminals 24 and 26 may be of a cup shape and metalic in nature so as to provide a Farady cup arrangement whose operation will be more fully explained hereafter. In addition, connected to the emitter 12 is a lead 31 connecting the emitter 12 to ground 32 via diode 34, the operation of which will become more apparent.

Positioned outside and at opposite ends of the discharge chamber 10 are oppositely charged accelerating electrodes 36 and 38, with leads 40 and 42 respectively connecting the electrodes to opposite terminals of an electrostatic generator 44. While two accelerating electrodes are shown in the figure, a single electrode being either positively or negatively charged may be utilized in their place, if so desired. This generator may be of any standard variety such as a Van de Gaff type etc. The operation of the generator 44 may be regulated through the use of a source of D.C. current 46 connected to the generator 44 via a switch 47. A closing of switch 47 would supply power to the generator causing an electrostatic charge to be placed upon the electrodes 36 and 38. Electrode 38 which is positioned at the collector end of the discharge chamber would receive a positive charge, while electrode 36 at the emitter end would receive a negative. Once this is sufficiently effected, switch 47 may be opened, discontinuing the static charging.

Since the electrodes are intended to be insulated from each other an appropriate means may be through the use of an outer chamber 48 with the discharge chamber 10 and electrodes 36 and 38 contained therein.

The outer chamber 48 may readily be filled with an insulating medium such as an insulating gas e.g., sulphur hexafloride, which may be placed under pressure.

When operating, electrostatic generator 44 creates or deposits a positive charge on electrode 38 and a negative charge on electrode 36 as aforementioned. The concentration of unbalanced electrostatic charges causes the propogation of electric fields and the creating of potentials at the electrodes, positive in the case of electrode 38 and negative in the case of electrode 36.

As a result, a potential difference is caused to exist across the space between the electrodes. Because the discharge chamber is made of material transparent to electric fields, the electric fields propogated by the electrodes penetrate the chamber wall and cause a potential difference to exist within the discharge chamber 10. The purpose of the electrodes and the potential difference they provide is to provide kinetic energy to free electric charges within the discharge chamber 10.

In placing the charged electrodes outside of the discharge chamber, the accumulated electrostatic charges on the electrodes are protected from neutralization by the free charges which exist within the chamber. These electrostatic charges will remain on the electrodes and provide the potential difference for longer periods of time than if they were subject to neutralization by the free charges in the chamber 10.

The insulating medium contained in the outer chamber and separating the charged electrodes serves to suppress any charge leakage from the electrodes to each other and their surroundings; preserving the charge thereon while allowing a greater quantity of charge to be accumulated on each electrode. Accordingly, larger potentials and a larger potential difference can be created between the electrodes.

The combined effect of placing the electrodes outside of the chamber 10 and using an insulating medium causes charge to remain for long periods of time on the electrodes. Since only a relatively small amount of energy is explained to charge the electrodes, the present arrangement provides for a potential difference for generating power very inexpensively.

After a potential difference has been established across the discharge chamber 10, the following will occur: high energy beta particles from radioactive source 16 are emitted into the gas medium in the chamber. This takes place at the end of the discharge chamber close to the negatively charged electrode 36 adjacent the emitter 12. Because of their high energy, the beta particles ionize the numerous gas atoms with which they collide within the discharge chamber, producing numerous charge pairs before loosing their energy. Since the space occupied by the gas is subject to the potential difference caused by the electrodes as aforementioned, kinetic energy is immediately supplied to the newly produced electrons by the potential difference, accelerating them through the medium in the direction of the positively charged electrode 38 and accordingly towards collector 14. Once having gained sufficient energy, the new electrons behave like the beta particles and ionize the neutral atoms in the medium in their path; multiplying the number of change pairs therein further still. By this cummulative ionization process, an electron avalanche occurs and a high current discharge which transforms the medium within the discharge chamber into a highly ionized and highly conductive electronic plasma. The electrons produced accelerate under the potential difference and finally impinge on collector 14.

Kinetic energy is also supplied to the positive ions by the potential difference and they too accelerate through the medium, but in the direction of the negatively charged electrode 36 and emitter 12. When the ions impact on the emitter 12, they loose their kinetic energy which reappears as thermal energy on the emitter surface. The continuous impact of numerous high energy positive ions on the emitter's surface releases large quantities of heat to same, greatly increasing its temperature.

Because of the thermionic emissive nature of the emitter, the high temperatures produced by kinetic energy conversion causes the continuous emission of copious amounts of electrons. Acceleration of these electrons through the medium tends to maintain the discharge and the plasma state. At this point, the discharge has become self sustaining, as long as the potential difference is maintained to accelerate electrons and ions in the plasma and cause them to behave in the manner as aforementioned.

It might be noted that the beta particles are needed only to initially ionize the medium and other means of initially ionizing it may be utilized. Once this has taken place, the beta particles are no longer necessary for the operation of the device.

In addition, the discharge current and therefore the number of free charge pairs in the medium is determined by the pressure in the discharge chamber 10 and may be varied as desired, providing a means of regulating the desired current output.

The creation and existence of the plasma supplies an abundance of positive ions and electrons which are acted on by the potential difference. Electrons are moved across the chamber to collector 14 where they are collected and discharged through lead 28 into the cup-shaped terminal 24. This cup shaped terminal 24 is in a sense a Faraday cup within which no charges can accumulate. Accordingly, the electrons pass to the outside of the cup creating a negative potential on the outer surface of the cup. This type of cup arrangement at the ends of leads 28 and 30 allows the collector 14 and emitter 12 to remain as close to zero potential as possible; thus preventing the creation of potentials which would retard the approach of oncoming charges.

Similar to the movement of the electrons, positive ions in the plasma are accelerated in an opposite direction to that of the electrons across the chamber to emitter 12 where they are collected, and where the positive ions become neutral atoms again.

The trapped positive charges move down lead 30 into cup-shaped terminal 26 and then to its outside where they accumulate; creating a positive charge and positive potential. In so doing, a potential difference is caused to exist across conductor 18 when the switch 22 is closed. Under this potential difference excess electrons from terminal 24 pass through the conductor to terminal 26 which has an electron deficiency. When the charged terminals discharge through the conductor in this manner, electric power is generated through the load 20.

The lead 31 is connected to the emitter 12 and allows electrons to migrate from the ground into the system even while the load circuit is open and thus allows a higher potential difference to be created at terminals 24 and 26 which allows for high current, high voltage and therefore high power electricity to be generated by the device.

It should be noted that although low ionization potential gas is mentioned, operation of the device is not limited to it. Any gas, vapor or any ionizable medium which will not result in the combustion of the electrodes may be used.

Also, while a self-sustaining discharge was specified since it is the most advantageous type which can be used, other discharges even of the non-self-sustaining type may be utilized in operation. In addition, while a thermionic emitter was described, a pool of mercury or any other medium which would liberate copious amounts of electrons when sufficiently heated may be utilized in its place for operation of the device.

Lastly, although thermionic emission utilizing the heat generated by positive ion bombardment of the emitter surface will advantageously create the greatest number of charges and allow the highest currents in the device, electric power may yet be generated utilizing other means of emitting electrons into the medium not adapted to utilize the heat produced by the bombardment of positive ions. One such means could be by field emitters supplying electrons.

While a somewhat detailed description of the preferred embodiment has been disclosed herein, its scope should not be limited thereby, rather its scope should be determined by that of the appended claims.

What is claimed is:

1. A device for generating an electric current comprising:
   a discharge chamber capable of containing an ionizable medium which provides free charges therein;
   means capable of ionizing said medium;
   accelerating means with said accelerating means being located outside of the discharge chamber to inhibit its neutralization by free charges when therein while being capable of exerting an accelerating field in said chamber to provide kinetic energy to said free charges;
   means for collecting free charges when in said chamber including, a first collector capable of collecting negative free charges, and a second collector capable of collecting positive free charges;
   each of said collectors adapted to connect to a load circuit to generate electric current therein;
   wherein operation of the device causes ionization of the medium which generates free charges in the chamber which are accelerated through the medium to the collectors causing continued ionization thereof and a build up of opposite charges on the respective collectors which is capable of being discharged through a load circuit.

2. The device in accordance with claim 1 wherein said accelerating means includes at least two oppositely charged accelerating electrodes positioned with respect to the discharge chamber so as to exert an electric field therein to accelerate the free charges.

3. The device in accordance with claim 1 or 2 which further includes a second chamber enclosing the discharge chamber and accelerating means, said second chamber being capable of containing an insulating medium therein to provide insulation against loss of charge from said acceleration means.

4. The device in accordance with claim 3 which includes an insulating medium, with said medium comprising hexafloride gas.

5. The device in accordance with claim 1 or 2 wherein the accelerating means is capable of accepting an electrostatic charge thereon.

6. The device in accordance with claim 1 or 2 wherein the means capable of ionizing said medium is a radioactive source.

7. The device in accordance with claim 1 or 2 which further includes an emitter means capable of emitting free charges in said chamber.

8. The device in accordance with claim 7 wherein said emitter means and the collector for the positive free charges are one and the same.

9. The device in accordance with claim 7 wherein said emitter means is capable of utilizing heat provided by positive ions impacting thereon to emit free charges in said chamber.

10. The device in accordance with claim 8 which further includes a means for creating a higher potential between the collectors during operation of the device with this means comprising a lead disposed between the emitter means and an electron source with said lead allowing electrons to flow in one direction from the source to the emitter.

11. The device in accordance with claim 1 or 2 which further includes a means of preventing the build up of retarding potentials on the collectors, with said means comprising a farady cup for each collector and leads connecting the collector to the inside of the cup with the outside of said cup adapted to connect to a load circuit.

* * * * *